United States Patent [19]

Morinigo et al.

[11] Patent Number: 5,309,050

[45] Date of Patent: May 3, 1994

[54] FERROMAGNETIC WIRE ELECTROMAGNETIC ACTUATOR

[75] Inventors: Fernando B. Morinigo, Los Angeles; Keith O. Stuart, Cypress, both of Calif.

[73] Assignee: Aura Systems, Inc., El Segundo, Calif.

[21] Appl. No.: 976,699

[22] Filed: Nov. 16, 1992

Related U.S. Application Data

[63] Continuation-in-part of Ser. No. 855,771, Mar. 23, 1992, Pat. No. 5,187,398, which is a continuation-in-part of Ser. No. 499,046, Mar. 26, 1990, Pat. No. 5,099,158, which is a continuation-in-part of Ser. No. 319,956, Mar. 7, 1989, Pat. No. 4,912,343, which is a continuation-in-part of Ser. No. 238,925, Aug. 31, 1988, abandoned.

[51] Int. Cl.$^5$ .................................................. H02K 41/00
[52] U.S. Cl. ........................................... 310/14; 310/23
[58] Field of Search .................... 310/12, 13, 14, 23, 310/24; 335/255, 256, 266, 279

[56] References Cited

U.S. PATENT DOCUMENTS

| | | | |
|---|---|---|---|
| 3,555,315 | 2/1970 | Hunsdorf | 310/67 |
| 4,075,517 | 2/1978 | Adler | 310/13 |
| 4,434,968 | 3/1984 | Smith | 254/1 |
| 4,456,934 | 6/1984 | Wedman et al. | 360/78 |
| 4,494,028 | 1/1985 | Brown | 310/56 |
| 4,612,467 | 9/1986 | Clegg | 310/27 |
| 4,612,470 | 9/1986 | Smith, Jr. et al. | 310/273 |
| 4,937,481 | 6/1990 | Vitale | 310/15 |
| 5,012,144 | 4/1991 | Huitema et al. | 310/14 |
| 5,187,398 | 3/1992 | Stuart et al. | 310/14 |

FOREIGN PATENT DOCUMENTS 0118749 5/1987 Japan .
0118750 5/1987 Japan .

*Primary Examiner*—Steven L. Stephan
*Assistant Examiner*—Judson H. Jones
*Attorney, Agent, or Firm*—Anthony T. Cascio; Lisa A. Clifford

[57] ABSTRACT

An electromagnetic actuator is disclosed having a case fabricated of a ferromagnetic material and defining a central axis, a core disposed coaxial with the central axis, and being in slideable engagement within the case. The core includes a first end portion, a second end portion, and a central portion. The actuator further includes magnetic flux developing element mounted coaxial with the central axis and a first and a second electrical current conductor coil. The first coil is mounted in a facing relationship with the first end portion of the core and the second coil is mounted in a facing relationship with the second end portion of the core. The coils are fabricated from a ferromagnetic material and are coaxial with the central axis. The coils have a cross-sectional length in a direction perpendicular to the central axis and a width of insulating space between the turns of the coil in a direction parallel to the central axis. The length and width are selected such that the reluctance of the width of the insulating space is greater than the reluctance of the cross-sectional length of the coil wire adjacent the insulating space.

23 Claims, 3 Drawing Sheets

FERROMAGNETIC WIRE ELECTROMAGNETIC ACTUATOR

RELATED APPLICATION DATA

The present application is a continuation-in-part of co-pending U.S. Pat. application No. 07/855,771, filed Mar. 23, 1992, now U.S. Pat. No. 5,187,398, which is a continuation in part of co-pending U.S. Pat. application No. 07/499,046, filed Mar. 26, 1990, issued as U.S. Pat. No. 5,099,158 on Mar. 24, 1992 (the "'158 Patent"); which in turn is a continuation in part of U.S. Pat. application No. 07/319,956, filed Mar. 7, 1989, now U.S. Pat. No. 4,912,343, issued Mar. 27, 1990 (the "'343 Patent"); which in turn is a continuation in part of U.S. Pat. application No. 07/238,925, filed Aug. 31, 1988, now abandoned; each of which has been assigned to the assignee of the invention described in the present application and which are incorporated herein by reference.

FIELD OF THE INVENTION

The present invention relates generally to electromagnetic actuators, and more particularly to an electromagnetic actuator using coil constructed from ferromagnetic materials.

BACKGROUND OF THE INVENTION

In the past, electromagnetic actuators, electromagnets, and other devices utilizing the interaction of electrical current and magnetic fields were customarily constructed such that the electrical current would flow in either a copper or aluminum material. This choice of material was based on the fact that copper and aluminum have substantially lower electrical resistivity than most other materials, yet are available at a relatively low cost. The low electrical resistivity is desirable in that, for a given current flowing in a conductor of a given geometry, the rate at which heat is generated is directly proportional to the electrical resistivity. Therefore, the use of copper or aluminum material in the coils is believed to reduce the heat generated and accordingly, reduce the energy lost to the heat. This reduction in heat is generally characteristic of devices having greater useful output per energy expended, and thus greater efficiency.

Many electromechanical devices use ferromagnetic materials to enhance or focus the magnetic fields upon which the device function depends. In these cases, the key property of the ferromagnetic materials is their high magnetic permeability. The magnetic field or flux lines will follow paths of volumes of high permeability. Therefore, the use of the ferromagnetic materials, such as iron, cobalt, nickel, and a wide variety of specialized alloys is also desired.

For a large class of electromagnetic devices, forces are produced by currents that flow in material placed in a magnetic field. In the prior art, ferromagnetic materials were used to guide, focus, and enhance the magnetic fields, and currents were made to flow in materials of low resistivity, such as copper or aluminum. The efficiency of such devices depends on the simultaneous presence of currents and magnetic flux in certain volumes. The insertion of copper or aluminum in these volumes reduces the magnetic flux by large factors from the amount of flux that would exist in an construction entirely of ferromagnetic materials.

Therefore, a need exists for an electromagnetic actuator design that uses ferromagnetic material as both a flux carrier and a current carrier, wherein the disadvantage of the high resistivity of the ferromagnetic material is more than compensated by the flux enhancements.

SUMMARY OF THE INVENTION

Accordingly, it is a primary object of the present invention to overcome one or more disadvantages and limitations of the prior art. A significant object of the present invention is to provide an electromagnetic actuator design that uses ferromagnetic material as both a flux carrier and a current carrier, wherein the disadvantage of the high resistivity of the ferromagnetic material is more than compensated by the flux enhancements.

According to a broad aspect of the present invention, an electromagnetic actuator comprises a case fabricated of a ferromagnetic material and defining a central axis, a core disposed coaxial with the central axis, and being in slideable engagement within the case. The core includes a first end portion, a second end portion, and a central portion. The actuator further includes an axially oriented magnetic flux developing element mounted coaxial with the central axis and a first and a second electrical current conductor coil. The first coil is mounted in a facing relationship with the first end portion of the core and the second coil is mounted in a facing relationship with the second end portion of the core. The coils are fabricated from a ferromagnetic material and are coaxial with the central axis. The coils have a cross-sectional length in a direction perpendicular to the central axis and a width of insulating space between the turns of the coil in a direction parallel to the central axis. The length and width are selected such that the reluctance of the width of the insulating space is greater than the reluctance of the cross-sectional length of the coil wire adjacent the insulating space.

A feature of the present invention is that the actuator utilizes less current and less power than a similar function actuator using aluminum or copper coils.

Another feature of the present invention is that the actuator having ferromagnetic wire coils utilizes a smaller permanent magnet mass than a similar function actuator using aluminum or copper coils.

A further feature of the present invention is that the total device mass and volume of the actuator having ferromagnetic wire coils is lower than a comparable function actuator using copper or aluminum coils.

Another feature of the present invention is that the force output at a given current for an actuator having ferromagnetic wire coils is higher than a comparable function actuator using copper or aluminum coils.

These and other objects, advantages and features of the present invention will become readily apparent to those skilled in the art from a study of the following description of an exemplary preferred embodiment when read in conjunction with the attached drawings and appended claims.

DESCRIPTION OF AN EXEMPLARY PREFERRED EMBODIMENT

Figure 1:
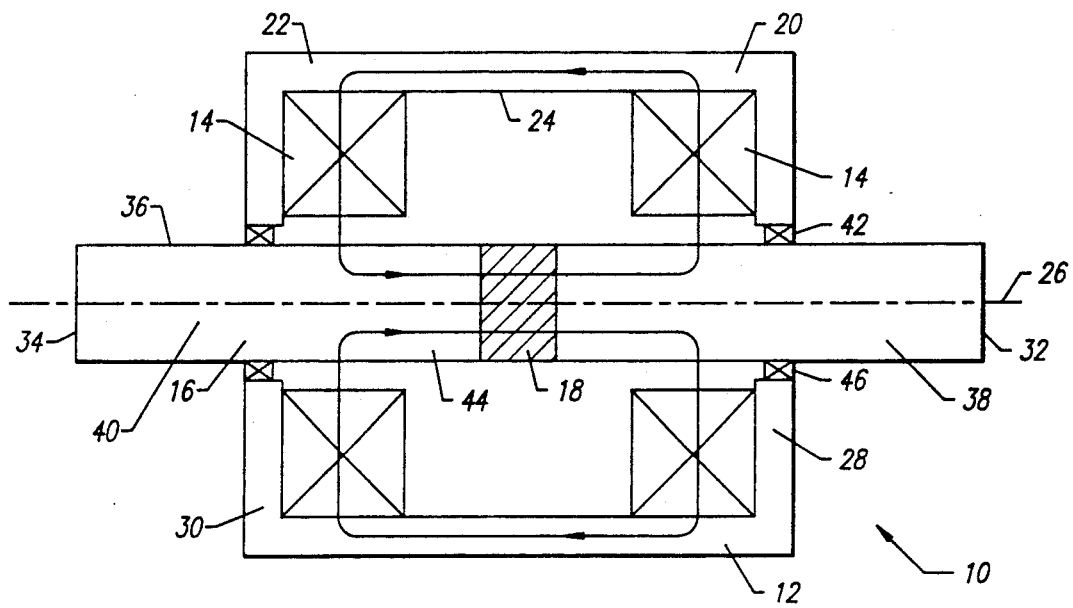
FIG. 1 is a cross-sectional view of one embodiment of an axial magnet ferromagnetic wire actuator of the present invention.

Referring now to FIG. 1, one embodiment of an electromagnetic actuator 10 constructed according to the principles of the present invention is shown. The actuator 10 comprises a case 12, a pair of electrical conductive current conductive coils 14, a core 16, and a magnetic flux developing element 18. Although each of these elements is described herein as being cylindrical in construction, it is to be understood that other geometries that satisfy the cooperation between the elements are within the scope of the present invention. For example, the elements may be constructed in a substantially rectangular construction.

The case 12 is preferably an elongated cylinder fabricated from a magnetic flux conductive material. The case 12 is also preferably fabricated from a ferromagnetic material. In the embodiment of the actuator 10 shown in FIG. 1, the case is constructed of an iron material. The case 12 has a first end 20, a second end 22, and an interior wall 24 extending from the first end 20 to the second end 22. The case 12 defines a central axis 26. A first and second end cap 28, 30 are preferably mounted on the corresponding first and second ends 20, 22 of the case 12. Each of the end caps 28, 30 shown in FIG. 1 include a central bore 42. The end caps 28, 30 are preferably fabricated from a non-magnetic material.

The core 16 is a cylinder fabricated from a magnetic flux conductive material. Preferably, the core is fabricated from a ferromagnetic material. In the embodiment shown in FIG. 1 the core is constructed from an iron material. The core 16 includes a first end 32, a second end 34, and an exterior wall 36 extending from the first end 32 to the second end 34. The exterior wall 36 has a first portion 38 adjacent the first core end 32, and a second portion 40 adjacent the second core end 34. A central portion 44 of the core 16 is located between the first core portion 38 and the second core portion 40. The core 16 is coaxially received within the case 12 and mounted in axial slideable engagement. As shown in FIG. 1, the first and second ends 32, 34 of the core 16 extend through the central bores 42 of the first and second end caps 28, 30. The actuator 10 may further include a plurality of bushings or bearings 46 disposed within the central bores 42 to accommodate the slideable engagement of the core 16 within the end caps 28, 30.

In the embodiment of the invention shown in FIG. 1, the magnetic flux developing element 18 is coaxially mounted within the central portion 44 of the core 12. In the embodiment shown in FIG. 1, the magnetic flux developing element 18 is axially oriented.

Figure 2:
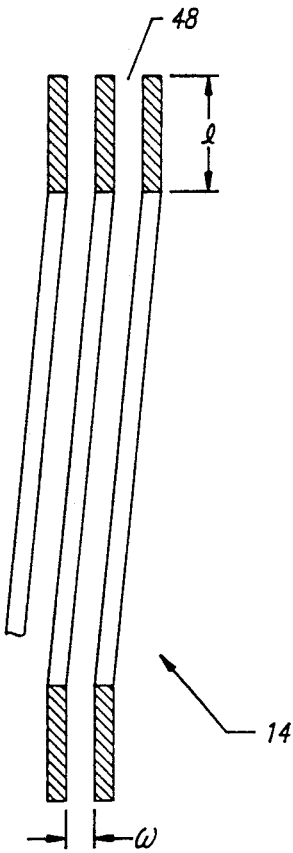
FIG. 2 is a cross-sectional view one embodiment of the ferromagnetic wire conductor coil of the actuator of FIG. 1.

Still referring to FIG. 1, the electrical current conductive coils 14 are disposed within the chamber of the case 12 adjacent the interior wall of the case 12. The coil 14 is disposed coaxial to the core 12 of the actuator 10. The electrical current conductive coils 14 may be either an edge wound type or a round wire type. Referring now to FIG. 2, the edge wound coil 14 is shown in detail. The coil 14 shown in FIG. 2, is wound in a cylindrical tubular shape, and has a rectangular cross-section. The length of the coil wire, designated by "l", is perpendicularly directed from the central axis 26. The width of the insulating space 48 between the turns of the coil 14 is designated by "w", and measured in a direction parallel to the central axis 26. Alternatively, the coil 14 may be a round wire coil.

Figure 3:
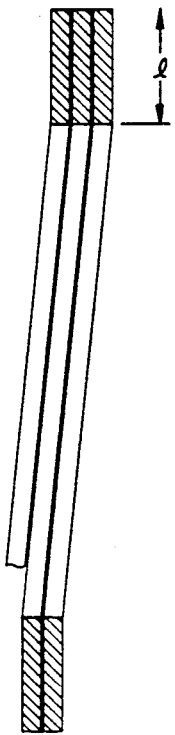
FIG. 3 is a cross-sectional view of an edge wound copper or aluminum conductor coil.

In order to use the ferromagnetic material, the coil 14 of the present invention is redesigned to reduce the resistance of the coil without substantially reducing the total force output. The redesign of the coil is best shown in FIGS. 2 and 3. FIG. 2 shows the design of a coil in an electromagnetic actuator using copper or aluminum material for the fabrication of the coil. FIG. 3 shows the redesigned coil 14 as used in the actuator of the present invention wherein the coil is comprised of a ferromagnetic material. More specifically, the conductor coil length "l" is increased in the direction perpendicular to the actuator axis, which is also in the direction parallel to the magnetic field through the coil 14. Increasing the length of the edge wound coil allows for a greater cross sectional area of the coil 14. When a round wire coil is used in an alternative embodiment, the diameter of the coil 14 is increased, which also allows for an increased cross-sectional area of the coil.

The corresponding feature of the design of the ferromagnetic wire coil 14 is that the percentage of the conductor coil 14 that is filled by insulator is increased. This feature is shown in FIGS. 2 and 3 by the increased width of the insulating space 48 between the turns of the coil 14. As a result of this redesign of the ferromagnetic wire coil 14, the number of turns in the conductor coil is reduced. However, the total volume of the conductor material in the magnetic field is not reduced. Therefore the length and width are selected at values such that the reluctance of the width of the insulating space is greater than the reluctance of the cross-sectional length of the coil wire adjacent the insulating space. These values, although related to each other, will vary according to the requirements for the actuator.

The advantages of using the ferromagnetic material in the present invention are explained by the following three characteristics of ferromagnetic material. It should also be noted that various ferromagnetic materials may be used in the actuator design of the present invention, including, but not limited to iron, cobalt, nickel, and other alloys. First, the use of the ferromagnetic material in the coil of the actuator causes the total reluctance of the magnetic circuit that crosses the coil to be substantially reduced. As a result, the permanent magnet will produce a larger magnetic flux with the same size permanent magnet than the prior art actuators using copper or aluminum coils. Alternatively, the reduced total reluctance will allow for a smaller permanent magnet to be used in connection with the ferromagnetic coil, while still producing the same magnetic flux as in a copper or aluminum coil of the actuators of the prior art.

Secondly, high permeability of the ferromagnetic material used in the actuator 10 of the present invention causes the magnetic flux lines to follow the ferromagnetic material's path of high permeability. As a result, the leakage flux is reduced. Therefore, the useful flux in the magnetic field of the actuator 10 of the present invention will be a larger percentage of the total flux produced.

Thirdly, in the actuator 10 of the present invention, the magnetic flux lines will pass through the ferromagnetic coil conductor, rather than any existing insulating material or gaps between the turns of the conductor coil. In comparison, in coils comprised of copper or aluminum, the flux lines may pass through the gaps or conductive material between the turns of the conductor coil. Therefore, a higher level of useful magnetic flux is obtained.

Figure 4:
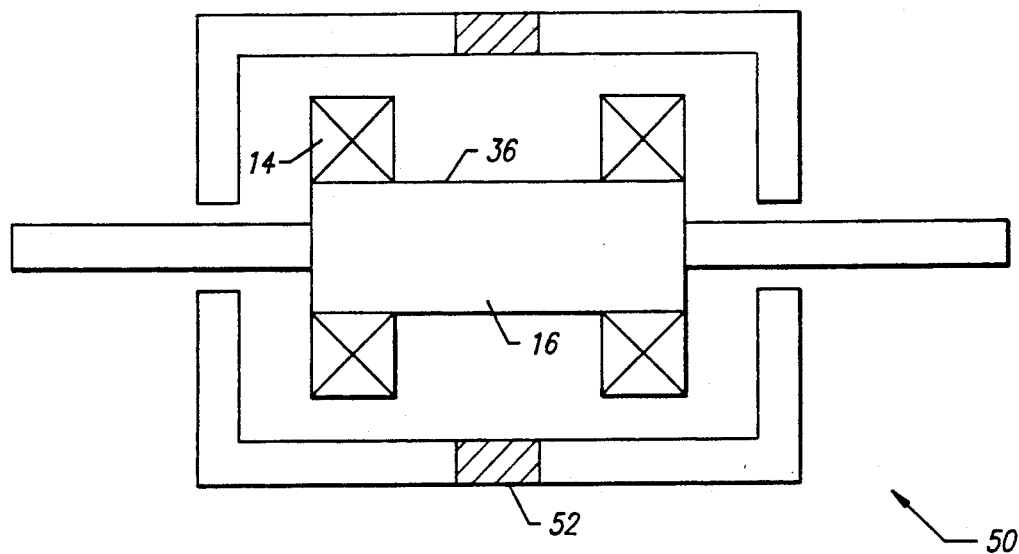
FIG. 4 is a cross-sectional view of an axial magnet ferromagnetic wire actuator with a moving coil.

Referring now to FIG. 4, a second embodiment 50 of the present invention is shown. This embodiment 50 is an axial magnet ferromagnetic wire actuator with a moving coil. In this embodiment, an axially oriented permanent magnetic ring 52 is disposed within the case 12. The coils 14 are secured to the moving core 16, such that the coils 14 move in an axial direction with the moving core 16.

Figure 5:
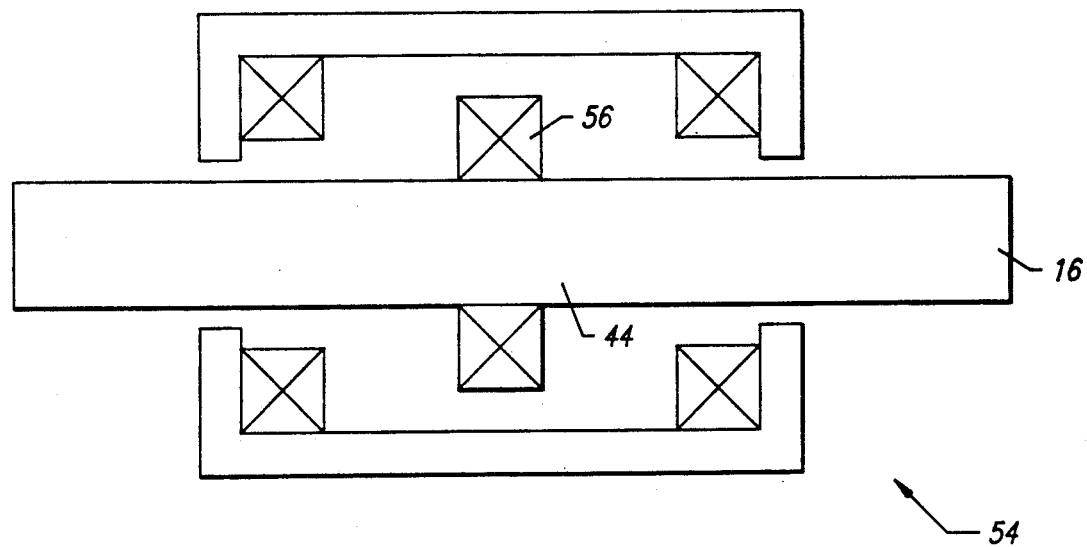
FIG. 5 is a cross-sectional view of an axial magnet ferromagnetic wire actuator with a moving field coil.

Referring now to FIG. 5, a third embodiment 54, an axial magnet ferromagnetic wire actuator with a moving field coil, is shown. In this embodiment 54 of the invention, a field coil 56 is secured to the moving core 16. The field coil 56 generates the static magnetic field instead of the permanent magnet as in the prior embodiments of the invention. The advantage of this design is that a greater amount of magnetic flux may be generated with the field coil 56. The disadvantage, however, is the amount of power required by this embodiment of the actuator.

Figure 6:
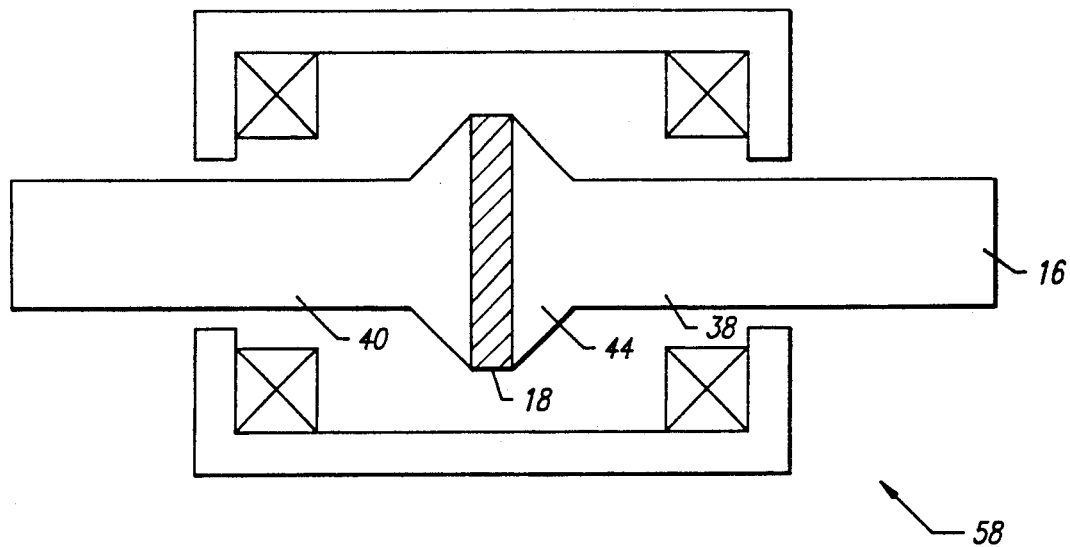
FIG. 6 is a cross-sectional view of an axial magnet ferromagnetic wire actuator with a focused moving magnet.

Referring now to FIG. 6, a fourth embodiment 58 of the invention is shown. The fourth embodiment 58 is an axial magnet ferromagnetic wire actuator with a focused moving magnet is shown. In this embodiment, the permanent magnet 18 and the central portion 44 of the core 16 surrounding the magnet 18 have a greater cross sectional area than the remaining first and second portions 38, 40 of the core 16. As a result, the flux generated by the magnet 18 is focused into the smaller cross sectional area of the core 16. Therefore the flux density in the first and second portions 38, 40 of the core is increased as compared to using a permanent magnet of the same cross-sectional area as the remaining portion of the core. The advantages of this design are that the flux density in the conductor coils 14 is increased, and therefore, the actuator provides greater force without requiring greater power.

Figure 7:
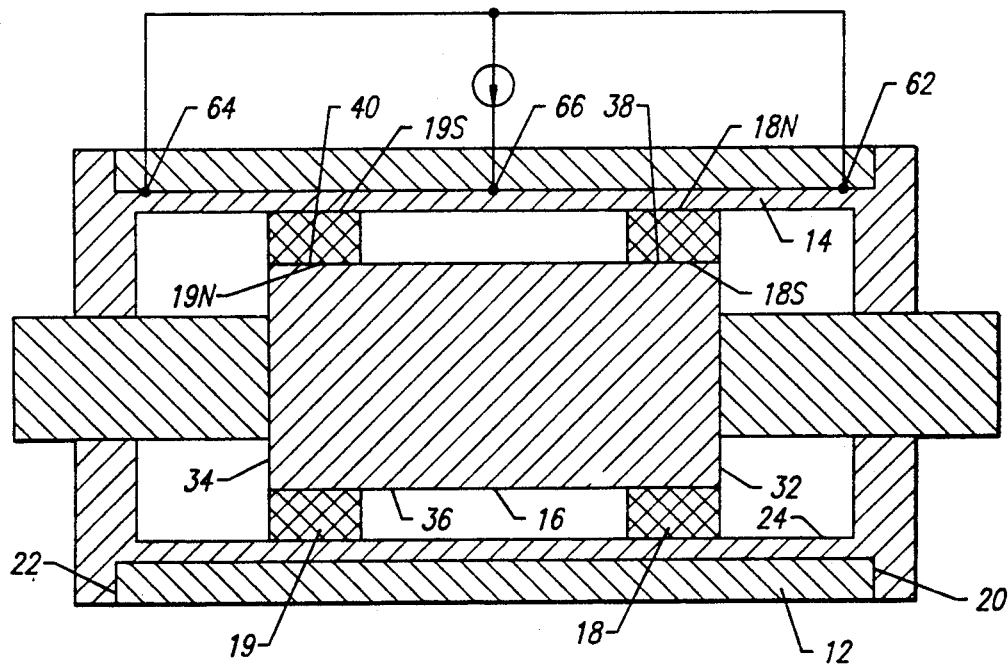
FIG. 7 is a cross-sectional of a radial magnet ferromagnetic wire actuator.

Referring now to FIG. 7, a fifth embodiment 60 of the invention is shown. In the fifth embodiment 60 of the actuator, the magnetic flux developing elements 18 are radially oriented. As shown in FIG. 7, the coil 14 is disposed in the chamber case 12 coextensively adjacent to the interior wall 24. The coil 14 has a first coil end 62 disposed proximate the first case end 20 and a second coil end 64 disposed proximate the second case end 22. The coil 14 further has a midpoint 66. As will be described in greater detail hereinbelow, the first coil end 62, the second coil end 64 and the midpoint 66 are provided so that electrical connection may be made to the coil 14.

The core 16 is coaxially received in the case 12 and mounted therein in axially slideable engagement. Accordingly, the cylindrical exterior wall 36 of the core 16 is radially spaced from the coil 14. Motion of the core 16 occurs between the first case end 20 and the second case end 22 such that the first portion 38 traverses the coil 14 in the axial direction between the first coil end 62 and the midpoint 66, and the second portion 40 axially traverses the coil 14 between the second coil end 64 and the midpoint 66.

Two magnetic elements 18, 19, are radially polarized and each have a first pole face 18S, 19S of a first magnetic polarity and a second pole face 18N, 19N of a second magnetic polarity opposite the first polarity. The first magnetic element 18 is carried by the first portion 38, with its first pole face 18S being adjacent the first portion 38 and its second pole face 18N being radially distal from the first portion 38 in a spaced relationship to the coil 14. Similarly, the second magnetic element 19 is carried by the second portion 40. The first pole face 19S of the second magnetic element 19 is radially distal from the second portion 40 in a spaced relationship to the coil 14 and its second pole face 19N is adjacent the second portion 40.

Accordingly, the magnetic flux developed by the magnetic flux developing elements 18, 19 is radially confined between the first portion 38 and the axial section of the interior wall 24 facing the first portion 38 and further confined between the second portion 40 and the axial section of the interior wall 24 facing the second portion 40. Furthermore, since the first magnetic element 18 is of reverse polarity to the second magnetic element 19, the radial flux between the first portion 38 and the interior wall 24 will be in the first direction and the radial flux between the second portion 40 and the interior wall 24 will be in the second opposite radial direction. Since magnetic flux will follow the path of lowest reluctance, the axially directed flux will occur in the core 16 between the first portion 38 and the second portion 40 and in the case 12 in an axial portion where the core 16 is present. For similar reasons, the flux emanating radially from the pole face 18N or the pole face 19S will not tend to fringe in an axial direction within the chamber of the case 12.

The coil is arranged so that an electrical current in the coil between the first coil end 62 and the midpoint 66 flows in an opposite direction with respect to the direction of the current in the coil between the second coil end 64 and the midpoint 66. Accordingly, the flux current cross product of the flux in the first radial direction between the pole face 18N and the current in the coil 14 and the flux current cross product of the flux in the second radial direction from pole face 19S and the current in the coil 14 are additive.

As best seen in FIG. 7, the coil current is flown in opposite direction, as hereinabove described, by applying the current to the midpoint 66 of a coil which is continuously wound along its axial length. The first coil end 62 and the second coil end 64 are connected in common to provide a current return path to the source of current. It should be noted that this embodiment is exemplary only, and that other actuator designs using radially oriented flux-developing elements may also use the ferromagnetic wire conductor coil of the present invention.

By way of example of the advantages of the ferromagnetic wire actuator, the following comparison between the actuator 10 of the present invention and a prior art actuator using copper or aluminum coils is given, wherein both actuators are designed to provide 110 pounds of output force. The prior art high force actuator, designed for operation at 110 pounds of output force, requires 240 amperes of current and 12610 watts of power. The actuator further requires a permanent magnet mass of 1.67 kilograms, an outside diameter of 9.0 centimeters, and a magnetic section length of 20.0 centimeters. In comparison, an actuator of the present invention having the same external dimensions as the prior art high force actuator, but utilizing a soft iron conductor instead of copper only requires 120 amperes of power and 6210 watts of power. Furthermore, the necessary permanent magnetic mass is only 0.42 kilograms. Therefore, as shown by the above figures, the actuator of the present invention provides a factor of two improvement in power and current consumption, and a factor of three improvement in the permanent magnetic mass requirement.

There has been described hereinabove an exemplary preferred embodiment of the linear actuator according to the principles of the present invention. Those skilled in the art may now make numerous uses of, and departures from, the above-described embodiments without departing from the inventive concepts disclosed herein. Accordingly, the present invention is to be defined solely by the scope of the following claims.

I claim as my invention:

1. A ferromagnetic wire actuator comprising:
   a case, said case having a first end, a second end, and an inner wall extending from said first end to said second end, and further defining a central axis;
   a core, said core being disposed within said case coaxial to said central axis and having a first core portion, a second core portion, a central core portion, and an outer wall;
   at least one magnetic flux developing element mounted coaxial with said central axis; and
   at least one electrical current conductor coil, said coil being disposed intermediate said core and said case, said coil further being fabricated from a ferromagnetic material and being coaxial with said core, wherein said coil has a cross-sectional length in a direction perpendicular to the central axis and a width of insulating space between the turns of the coil in a direction parallel to the central axis, said length and width being selected such that the reluctance of the width of the insulating space is greater than the reluctance of the cross-sectional length of the coil wire adjacent the insulating space.

2. A ferromagnetic wire actuator in accordance with claim 1 wherein said coil comprises a first and a second electrical current conductor coil, said first coil being mounted in a facing relationship with said first end portion of said core and said second coil being mounted in a facing relationship with said second end portion of said core.

3. A ferromagnetic wire actuator in accordance with claim 1 wherein said magnetic flux developing element is axially oriented.

4. A ferromagnetic wire actuator in accordance with claim 1 wherein said magnetic flux developing element is radially oriented.

5. A ferromagnetic wire actuator in accordance with claim 1 wherein said case is comprised of a ferromagnetic material.

6. A ferromagnetic wire actuator in accordance with claim 1 further comprising a first and a second end cap fabricated from a nonmagnetic material, said first end cap being mounted to the first end of said case and said second end cap being mounted to said second end of said case, and further wherein each of said end caps includes a central bore.

7. A ferromagnetic wire actuator in accordance with claim 1 wherein said coils are secured to the inner wall of said case.

8. A ferromagnetic wire actuator in accordance with claim 1 wherein said coils are secured to the outer wall of said core.

9. A ferromagnetic wire actuator in accordance with claim 1 wherein said coils are of an edge wound construction.

10. A ferromagnetic wire actuator in accordance with claim 1 wherein said coils are of a round wire construction.

11. A ferromagnetic wire actuator in accordance with claim 1 wherein said magnetic flux developing element is mounted within the central portion of said core.

12. A ferromagnetic wire actuator in accordance with claim 1 wherein said magnetic flux developing element is a permanent magnet ring mounted within said case.

13. A ferromagnetic wire actuator in accordance with claim 1 wherein said magnetic flux developing element is a field coil mounted to the outer wall of said core.

14. A ferromagnetic wire actuator in accordance with claim 9 wherein said said magnetic flux developing element and said core central portion are of a cross-sectional area greater than the cross-sectional area of the first and second core portions.

15. An electromagnetic ferromagnetic wire actuator comprising:
    a case, said case being fabricated of a ferromagnetic material and defining a central axis;
    a core, said core being disposed coaxial with said central axis, and being in slideable engagement within said case, said core further having a first end portion, a second end portion, a central portion, and an outer wall;
    at least one magnetic flux developing element mounted coaxial with said central axis; and
    a first and a second electrical current conductor coil disposed intermediate said case and said core, said first coil being mounted in a facing relationship with said first end portion of said core and said second coil being mounted in a facing relationship with said second end portion of said core, said coils being fabricated from a ferromagnetic material and being coaxial with said central axis, wherein said coil has a cross-sectional area and a width of insulating space between the turns of the coil in a direction parallel to the central axis, said area and width values being selected such that the reluctance of the width of the insulating space is greater than the reluctance of the cross-sectional area of the coil wire adjacent the insulating space.

16. A ferromagnetic wire actuator in accordance with claim 15 wherein said coils are of an edge wound construction.

17. A ferromagnetic wire actuator in accordance with claim 15 wherein said coils are of a round wire construction.

18. A ferromagnetic wire actuator in accordance with claim 15 wherein said magnetic flux developing element is axially oriented.

19. A ferromagnetic wire actuator in accordance with claim 15 wherein said magnetic flux developing element is radially oriented.

20. A ferromagnetic wire actuator in accordance with claim 15 wherein said magnetic flux developing element is mounted within the central portion of said core.

21. A ferromagnetic wire actuator in accordance with claim 15 wherein said magnetic flux developing element is a permanent magnet ring mounted within said case.

22. A ferromagnetic wire actuator in accordance with claim 15 wherein said magnetic flux developing element is a field coil mounted to the outer wall of said core.

23. A ferromagnetic wire actuator in accordance with claim 20 wherein said said magnetic flux developing element and said core central portion are of a cross-sectional area greater than the cross-sectional area of the first and second core portions.

* * * * *